A. J. Gibson.
Broilers.

Nº 75673. Patented Mar. 17, 1868.

ATTEST.
Charles L. Fisher
John H. Bogart

INVENTOR.
A. J. Gibson

United States Patent Office.

A. J. GIBSON, OF CINCINNATI, OHIO.

Letters Patent No. 75,673, dated March 17, 1868.

---

IMPROVEMENT IN BROILERS.

---

The Schedule referred to in these Letters Patent and making part of the same.

---

TO ALL WHOM IT MAY CONCERN:

Be it known that I, A. J. GIBSON, of Cincinnati, in the county of Hamilton, and State of Ohio, have invented a new and improved Mode of Cooking, of which the following is a full and clear description, reference being had to the accompanying drawings, and to letters of reference marked thereon.

The nature of my invention consists in constructing a broiling or baking-vessel by means of hollow cones and corrugations without perforations, to enable cooking to be done by the use of any kind of fuel.

Figure 1:
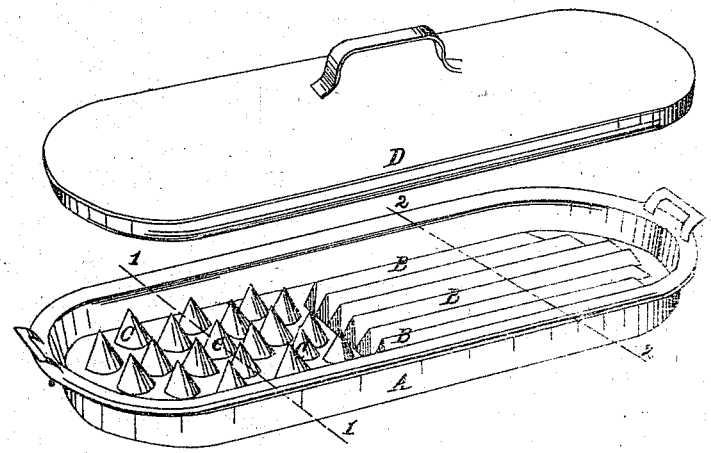
Figure 1 represents a perspective view of my improved broiler, showing a half made by the introduction of hollow cones, and a half by means of corrugation.
Figure 2:
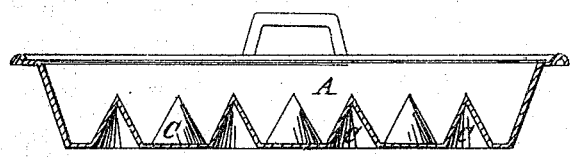
Figure 2 is a transverse section of the same in the line 1 1.
Figure 3:
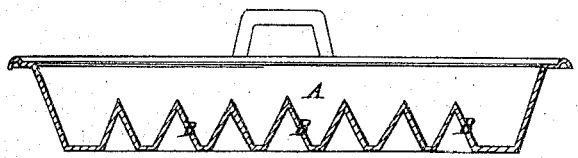
Figure 3 is a transverse section of the same in the line 2 2.

This drawing represents a half made with hollow cones and a half with corrugations. A is a vessel for cooking meats, fish, and a variety of articles of diet. To adapt it for the various kinds of cooking, especially for broiling beefsteak, I construct it in a manner to form elevation, without perforations from the base of vessel A, by means of corrugations B B B, or hollow cones C C C. D is a cover to place over the vessel A while cooking, to retain heat, moisture, and flavor; also, to prevent smoke, ashes, or anything injurious entering the vessel A.

The advantages derived from broiling a beefsteak, or any kind of meat, by means of elevating it from the base of vessel A on hollow cones or corrugations, or their equivalent, without perforations, is that the cooking can be done over any kind of fuel or heat. The vessel A can be placed on top of a cook-stove, range, gas, or any kind of fixture desirable. The heat ascending from the base of corrugations or hollow cones produces an increased heating-surface. The gravy is deposited below the meat, and saved from being burnt and destroyed, for the purpose of flavoring the fibre by the gases contained in the gravy while in the heated condition below. There being seventy-four (74) parts of water contained in beefsteak, it is found desirable to use a cover, D, to retain the steam that is made while in the process of broiling. As the broiler is non-perforated, the result is that a moist, tender, and natural-flavored steak is produced. All gas, smoke, and injurious matter are prevented from coming in contact with the substance while cooking.

Equal advantages are secured by the construction and operation of this vessel in toasting and steaming bread for toast; also, for boiling eggs, and an endless variety of kinds of cooking.

A very important advantage in my invention over the common perforated gridiron is, my improvement has no perforations, consequently no impurities can come in contact while cooking any substance, no matter what kind of fuel is used. This vessel is well adapted for a portable oven for baking, only depending on heating it gradually, and requiring more time than for broiling.

I do not claim the use of either cones or corrugations alone in connection with a broiling-vessel, but—

What I do claim as new, and desire to secure by Letters Patent, is—

The combination, in a broiling-vessel, of non-perforated cones and corrugations, substantially as described.

A. J. GIBSON.

Witnesses:
CHARLES L. FISHER,
JOHN H. BOGART.